(12) United States Patent
Nies

(10) Patent No.: US 8,515,051 B2
(45) Date of Patent: Aug. 20, 2013

(54) DETERMINING AND DISPLAYING APPLICATION USAGE DATA IN A CONTACT CENTER ENVIRONMENT

(75) Inventor: James Gordon Nies, Carmel, IN (US)

(73) Assignee: Verint Americas, Inc., Alpharetta, GA (US)

(*) Notice: Subject to any disclaimer, the term of this patent is extended or adjusted under 35 U.S.C. 154(b) by 112 days.

(21) Appl. No.: 13/182,672

(22) Filed: Jul. 14, 2011

(65) Prior Publication Data

US 2012/0014516 A1   Jan. 19, 2012

Related U.S. Application Data

(60) Provisional application No. 61/364,037, filed on Jul. 14, 2010.

(51) Int. Cl.
*H04M 3/00* (2006.01)
*H04M 5/00* (2006.01)
*H04M 15/00* (2006.01)

(52) U.S. Cl.
USPC ............. 379/265.03; 379/265.06; 379/112.06

(58) Field of Classification Search
USPC ............. 379/112.06, 265.03, 265.06, 265.08, 379/266.1
See application file for complete search history.

(56) References Cited

U.S. PATENT DOCUMENTS

| | | | |
|---|---|---|---|
| 2003/0002653 A1* | 1/2003 | Uckun | 379/266.06 |
| 2005/0183143 A1* | 8/2005 | Anderholm et al. | 726/22 |
| 2007/0206766 A1* | 9/2007 | Keren et al. | 379/265.01 |

* cited by examiner

*Primary Examiner* — Quoc D Tran
(74) *Attorney, Agent, or Firm* — Meunier Carlin & Curfman

(57) ABSTRACT

Embodiments disclosed herein provide systems and methods for processing and displaying call state and application usage information in a contact center environment. In a particular embodiment, a method provides receiving application usage information and call state information and processing the application usage information and the call state information to determine an amount of time spent using each application of a plurality of applications by each agent of a plurality of agents during each call state of a plurality of call states. The method further provides generating a representation of the amount of time spent using at least one of the plurality of applications by at least one of the plurality of agents during at least one of the plurality of call states.

20 Claims, 5 Drawing Sheets

DETERMINING AND DISPLAYING APPLICATION USAGE DATA IN A CONTACT CENTER ENVIRONMENT

CROSS REFERENCE

This application claims the benefit of U.S. Provisional Application No. 61/364,037, filed Jul. 14, 2010, which is hereby incorporated by reference in its entirety.

TECHNICAL BACKGROUND

Enterprises use contact centers to communicate with customers and potential customers. Contact centers may be used to provide tech support, sale support, information, or any other type of communications that an enterprise may need to exchange with a caller. Agents of the enterprise staff contact centers to interact with callers regarding the matters for which the caller is inquiring. While participating in calls with customers, contact center agents may use a variety of computer applications during the various states of the customer calls.

OVERVIEW

Embodiments disclosed herein provide systems and methods for processing and displaying call state and application usage information in a contact center environment. In a particular embodiment, a method provides receiving application usage information and call state information and processing the application usage information and the call state information to determine an amount of time spent using each application of a plurality of applications by each agent of a plurality of agents during each call state of a plurality of call states. The method further provides generating a representation of the amount of time spent using at least one of the plurality of applications by at least one of the plurality of agents during at least one of the plurality of call states.

In some embodiments, the representation is a graphical representation and the method further comprises displaying the graphical representation.

In some embodiments, the application usage information further includes an indicator about specific functionalities used for each application of the plurality of applications.

In some embodiments, the application usage information includes an occurrence time and duration for each instance that each application of the plurality of applications was used and the call state information includes an occurrence time and duration for each occurrence of each call state of the plurality of call states.

In some embodiments, determining the at least one agent of the plurality of agents for which the graphical representation should be displayed comprises receiving a user indication of the at least one agent.

In some embodiments, determining the at least one agent of the plurality of agents for which the graphical representation should be displayed comprises selecting the at least one agent of the plurality of agents based on the application information and the call state information meeting a criteria.

In some embodiments, the criteria comprises a threshold amount of time that an application of the plurality of applications is used during a call state of the plurality of call states and wherein exceeding the threshold results in the selection of the at least one agent.

In another embodiment, a system for analyzing application usage comprises an interface configured to receive application usage information and call state information. The system further comprises a processing system configured to process the application usage information and the call state information to determine an amount of time spent using each application of a plurality of applications by each agent of a plurality of agents during each call state of a plurality of call states and generate a graphical representation of the amount of time spent using at least one of the plurality of applications by at least one of the plurality of agents during at least one of the plurality of call states.

In another embodiment, a computer readable medium having instructions stored thereon for operating a system for analyzing application usage, wherein the instructions, when executed by the system, instruct the system to receive application usage information and call state information, wherein the application usage information includes application timing information for each instance that each application of the plurality of applications was used and the call state information includes call state timing information for each occurrence of each call state of the plurality of call states. The instructions further instruct the system to process the application usage information and the call state information to determine an amount of time spent using each application of a plurality of applications by each agent of a plurality of agents during each call state of a plurality of call states. The instructions further instruct the system to generate a representation of the amount of time spent using at least one of the plurality of applications by at least one of the plurality of agents during at least one of the plurality of call states.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
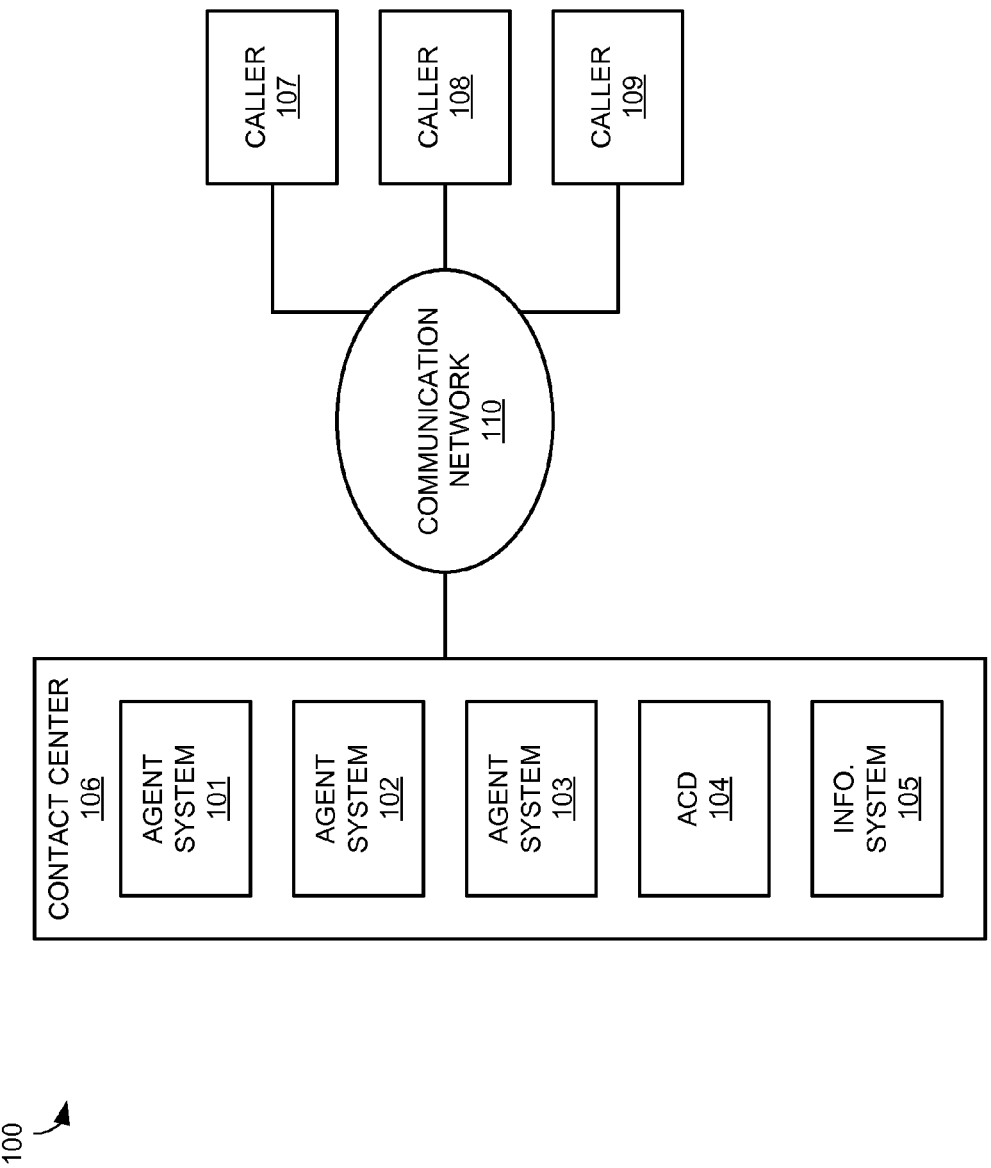
FIG. 1 illustrates a contact center communication system.

FIG. 1 illustrates communication system 100. Communication system 100 includes agent systems 101-103, automatic call distributor (ACD) 104, and information computer system 105 as part of contact center 106. Communication system 100 further includes callers 107-109 and communication network 110. Agent systems 101-103 may include telephones, soft phones, VoIP phones, or computer workstations, including combinations thereof, which are operated by agents of contact center 105 to assist and communicate with callers 107-109. It should be understood that the agent systems may be operated by any type of user in any environment, not necessarily a contact center, that may desire to monitor application usage during various call states as described below.

Contact center 106 may be a physical contact center in one or more locations, or contact center 106 may be a virtual contact center. Callers 107-109 may communicate using telephones, soft phones, VoIP phones, or any other device that a user may operate to communicate with contact center 106. Contact center 106 may include a network or collection of networks that link agent systems 101-103 with each other along with ACD 104 and information system 105.

Communication network 110 is a network or collection of networks that comprise telephony switches, wireless access nodes, Internet routers, network gateways, computer systems, communication links, or some other type of communication equipment—including combinations thereof.

The functionality described herein for information system 105 may be performed by a distinct computer system as illustrated by FIG. 1. However, the functionality of information 105 may be integrated or spread across multiple systems of contact center 106, such as ACD 104, agent systems 101-103, a workforce management system, or any other system that may be in a contact center that is not illustrated in FIG. 1.

Figure 2:
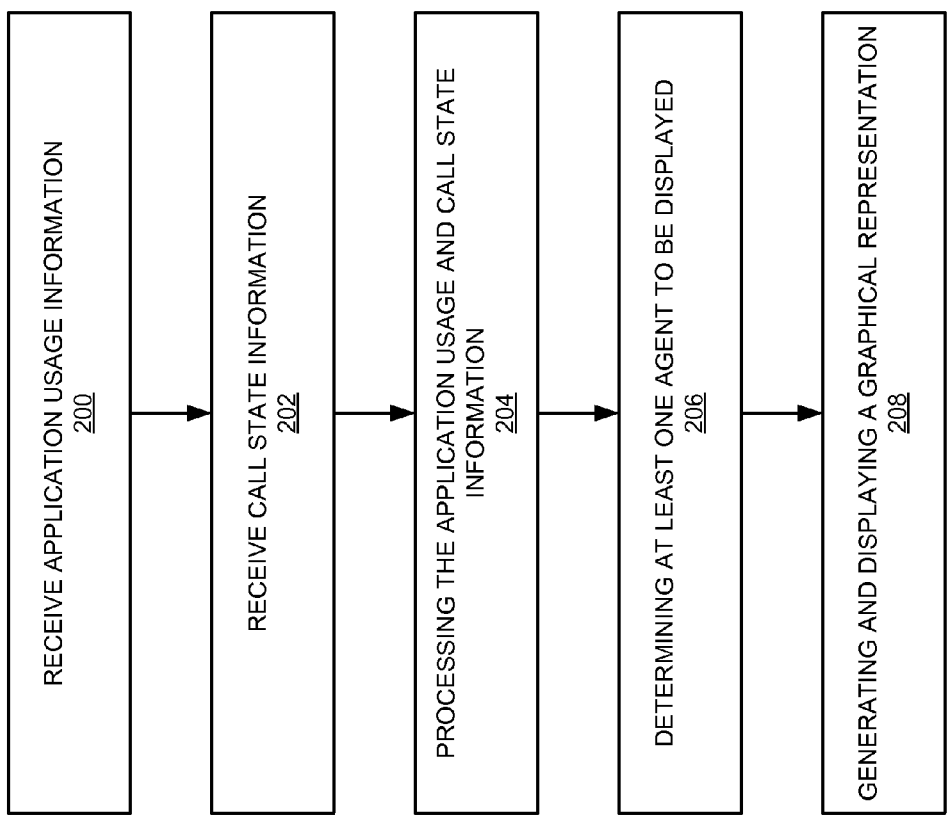
FIG. 2 illustrates the operation of the contact center communication system.

FIG. 2 illustrates the operation of wireless communication system 100. In operation, ACD 104 routes calls from callers 107-109 to one of agent systems 101-103. ACD 104 may further hold calls from callers 107-109 if none of agent systems 101-103 are available to receive a call. Furthermore, ACD 104 may determine a particular agent of agent systems 101-103 to which a call should be routed. For example, a technical support call with a specific problem may need to be routed to the agent system that is operated by an agent with a particular skill set necessary for handling the call.

The operation begins with information system 105 receiving application usage information for a plurality of applications used by agents operating agent systems 101-103 (step 200). The applications may be running on agent systems 101-103 but may also be applications running remotely on other computer systems in contact center 106 or elsewhere. The applications may be customer relationship management (CRM) applications, knowledge base applications, email, web browsing, messaging, or any other type of application that a contact center agent may use when performing his or her job. Additionally, application usage may include information about idle time when applications are not being used. Idle time may be useful in determining that an agent did not use an application during a certain call state that should have been used. The application information may include information as to when an agent used the application, how long the agent used the application, what the agent did with the application, what functions of the application were used by the agent, or any other type of information about the use of an application by an agent.

The application information may be obtained from agent systems 101-103 by monitoring various elements of agent systems 101-103. These elements may include input devices, such as a keyboard or mouse, output devices, such as a display or speaker, software processes executing on the agent system, or any other element that may be useful to monitor in order to determine application usage information. For example, one of agent systems 101-103 may monitor process calls the agent system in order to determine that an agent is using a particular application and for how long that application is being used. Furthermore, the process calls may further indicate what specific functionalities of the application the agent is using. For example, many email applications not only have messaging functionality but also have calendar functionality that the agent could be using. Similarly, remote applications, such as cloud or web-based applications, may be available to agent systems 101-103. These applications may be accessed through an application like a web browser. Rather than an agent system reporting on the mere fact that a web browser application is in use, the agent system is able to monitor remote applications running in the web browser that is used by the agent.

Information system 105 also receives call state information for the plurality of agents (step 202). The call state information may indicate when an agent is participating in various call states, how long the agent was performing in various call states, or any other information relating to a call state in a contact center. Exemplary call states may include talk state, hold state, wrap up state, administrative work state, or any other possible state that a contact center call may take. The call state information may be received from agent systems 101-103 or may be received from ACD 104.

Information system 105 then processes the application usage information and the call state information to determine the amount of time spent by each agent using each application during each call state (step 204). Information system 105 may process the usage and state information by determining which applications are used during which call states. The determination may be performed by comparing timing information for the call states with timing information for the application usage. This allows information system 105 to determine which calls states and applications were occurring at the same time. The timing information may include start time, stop time, and duration of use for each application and each call state.

The determination may further include how long a particular application is used during a given call state, what point in the call state the application is used, what time of day the application and call state are each occurring, or any other timing information related to application usage or call state. The information may, therefore, be an aggregate of multiple application uses during multiple call state instances. In some situations, the application usage may span call states. For example, 5 minutes of application usage may occur during one state and another 2 may run into a second state for a total of 7 minutes with 5 attributed to one state and 2 attributed to the other.

In some embodiments, information system 105 then determines at least one agent of the contact center agents using agent systems 101-103 to be displayed (step 206). Information system 105 may make the determination in various ways. In one example, information system 105 may determine the at least one agent by receiving a user selection from a user, such as a contact center manager. Alternatively, information system 105 may be configured to automatically display information for various agents at certain times, such as every 30 minutes or at 1:30 p.m. everyday.

In one more example, information system 105 may be configured to display agents where the usage and state information for those agents shows application usage exceeds a threshold as to be considered necessary for display, such as using a particular application for a longer length of time than would normally be required in a certain call state. Alternatively, information system 105 may be configured to display agents where the usage and state information for those agents shows that an application was not used enough during a particular call state to be considered acceptable.

Additionally, information system 105 may receive input or be preconfigured with a past period of time to which the call state and application usage information should extend. For example, a user of information system 105 may wish to see the information for the previous five shifts of an agent, thus, the user may configure information system 105 to keep track of call state and application usage information for the previous five shifts. Similarly, information system 105 may only track application usage and call state information for a limited period of time for which to display, such as the past two weeks of agent shifts.

After determining the at least one agent to display, information system 105 generates and displays a graphical representation of the amount of time spent by the at least one agent using each application during each call state (step 208). The graphical display may take many forms and use many different display features, such as graphs, charts, tables, lists, or any other way of graphically conveying information—including combinations thereof.

Figure 3:
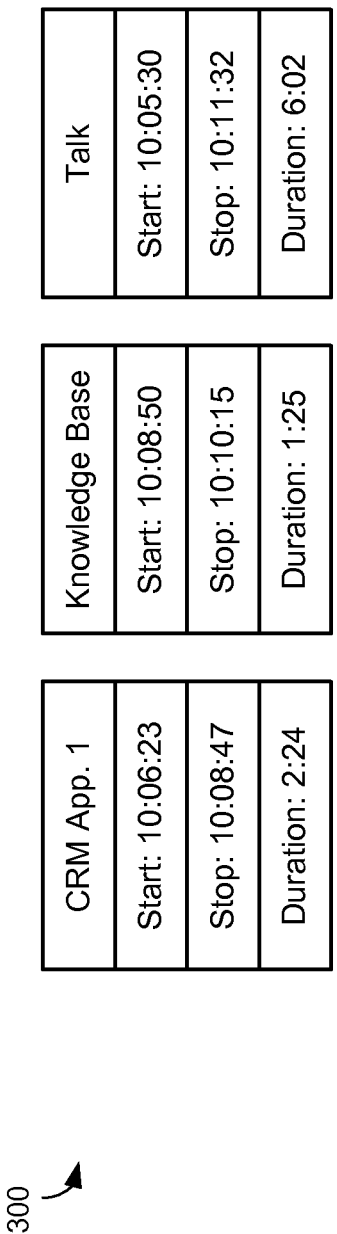
FIG. 3 illustrates a data set of application and call state information.

FIG. 3 illustrates an abstraction of the data that may be obtained as application or call state information from one of agent systems 101-103. While the data shown in FIG. 3 is organized in a tabular format the data may be transferred in any format and be divided in any way. For example, instead of being sent together, the start times and stop times may be transferred at the time in which they each occur.

Data set 300 includes two items of application information and one of call state information. The application information shows that CRM Application 1 was used by an agent starting at 10:06:23 and ending at 10:08:47 for a duration of 2 minutes and 24 seconds. Additionally, Knowledge Base Application was used by the agent starting at 10:08:50 and ending at 10:10:15 for a duration of 1 minute and 25 seconds. The call state information shows that the agent was in a talk state from 10:05:30 to 10:11:32 for a duration of 6 minutes and 2 seconds. While the application and call-state information shown in data set 300 includes the duration, information system 105 may derive the duration itself from the start and stop times provided in the data.

Information system 105, processes data set 300 to determine that start and stop times for the instances of CRM Application 1 and Knowledge Base Application enumerated in data set 300 fell within the time of the Talk call state enumerated in data set 300. Therefore, information system 105 increments the time spent using CRM Application 1 during the Talk call state by 2:24 and the time spent using Knowledge Base Application by 1:25. Likewise, information system 105 increments the total time spent in the Talk call state by 6:02.

As information system 105 receives more application and call state information data sets, information system 105 will increment the time for each application during each call state accordingly.

Figure 4:
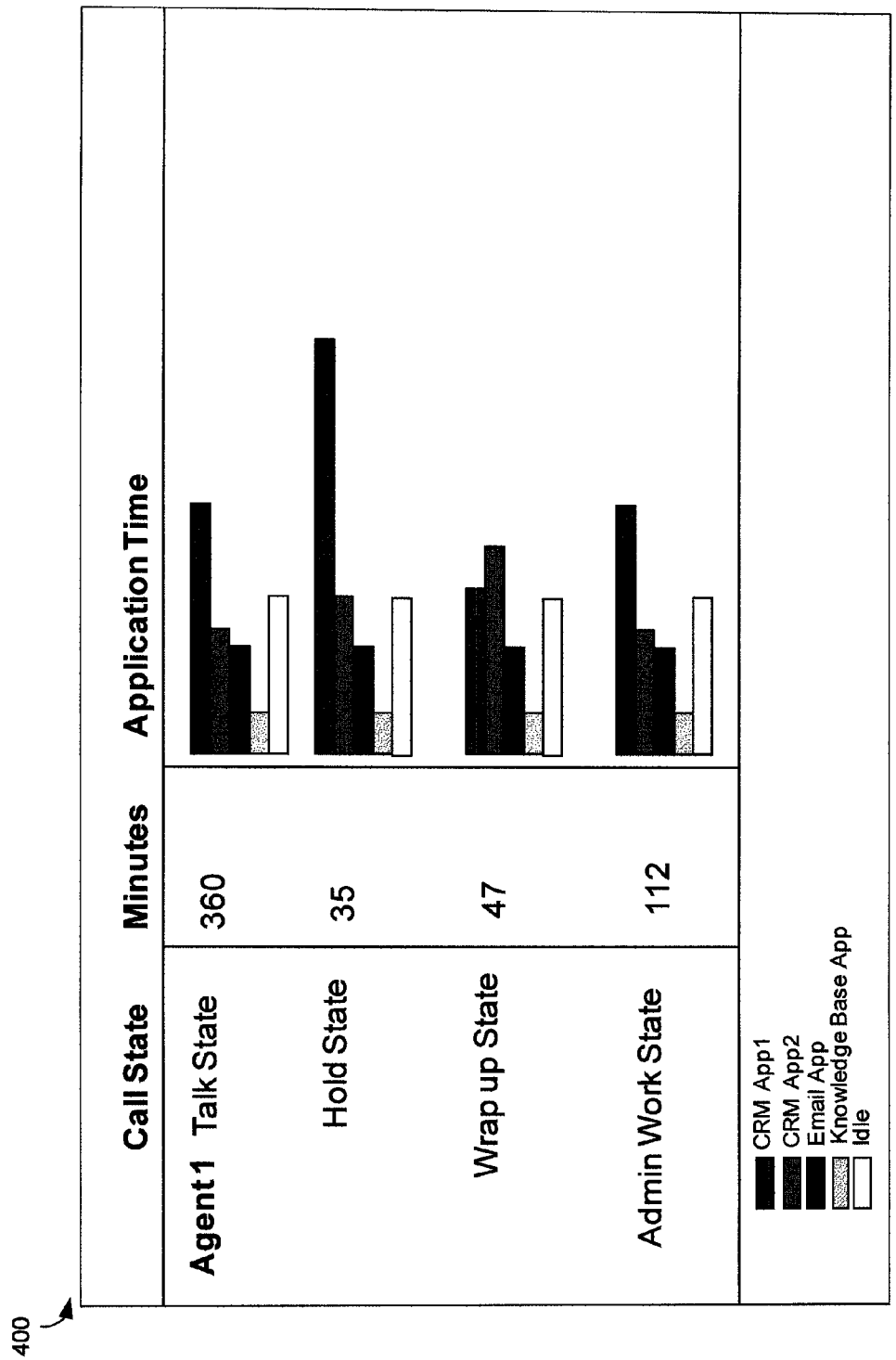
FIG. 4 illustrates an information display.

FIG. 4 illustrates display 400 of agent application use and call state information in an exemplary embodiment. Display 400 may be shown on a computer monitor, a window within a computer monitor, a paper print out, or any other way of visually presenting information. Display 400 includes a call state column, a column for the number of minutes spent in the respective call state, a column for amount of time spent using a particular application, and a legend for the applications.

Display 400 shows that Agent 1, which may be the agent operating one of agent systems 101-103, spent time in the talk, hold, wrap-up, and administrative work states. Agent 1, for the time period displayed in display 400, spent 360 minutes, 35 minutes, 47 minutes, and 112 minutes cumulatively in each call state, respectively, during the time period displayed in display 400. Also, the application time column shows a bar graph of how much of the total time in each call state was spent using each application relative to the other applications used. For example, in the call state, CRM application 1 is used for about twice as long as CRM application 2 and email was used for just over twice as long as the knowledge base application.

In some embodiments, display 400 may further display the usage time for specific functionalities of the applications that were used by Agent 1. For example, the applications displayed on display 400 may all be web apps that were used within a web browser application.

In some embodiments, display 400 may show usage information for multiple agents on an individual basis or with the usage information for the multiple agents combined to show usage information across the multiple agents.

In other embodiments, display 400 may have different formats for displaying the information. For example, the bar graphs my include a time scale to be more precise about application usage time or the bar graphs may be replaced with some other way of displaying usage time information. In another example, the call state usage time may be shown as a graph rather than numerical values.

Figure 5:
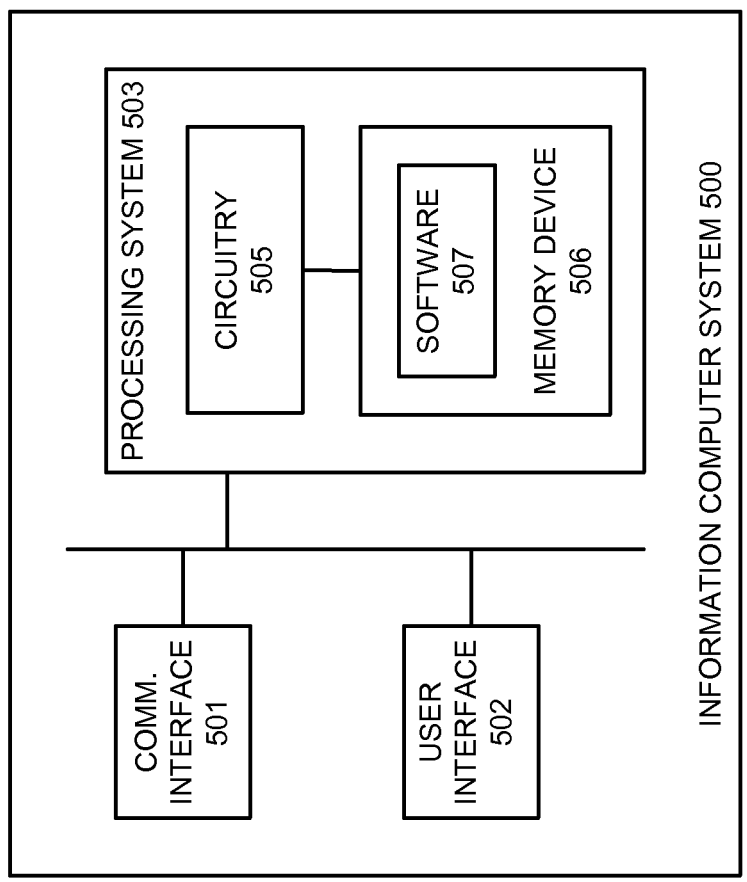
FIG. 5 illustrates an information computer system.

FIG. 5 illustrates information computer system 500. Information computer system 500 is an example of information system 105, although information system 105 may use alternative configurations. Information computer system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. Communication interface 501 is configured to receive application usage information and call state information.

User interface 502 comprises components that interact with a user. User interface 502 may include a keyboard, display screen, mouse, touch pad, printer, or some other user input/output apparatus. User interface 502 is configured to display a graphical representation of the amount of time spent using at least one of a plurality of applications by at least one of a plurality of agents during at least one of a plurality of call states Processing circuitry 505 comprises microprocessor and other circuitry that retrieves and executes operating software 507 from memory device 506. Memory device 506 comprises a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software. When executed by circuitry 505, operating software 507 directs processing system 503 to operate information computer system 500 as described herein.

In particular, operating software 507 directs processing system 503 to processing the application usage information and the call state information to determine an amount of time spent using each application of the plurality of applications by each agent of the plurality of agents during each call state of the plurality of call states. Operating software 507 further directs the processing system 503 to generate the graphical representation of the amount of time spent using at least one of the plurality of applications by at least one of the plurality of agents during at least one of the plurality of call states.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for analyzing application usage, comprising:
receiving application usage information and call state information;
processing the application usage information and the call state information to determine an amount of time spent using each application of a plurality of applications by each user of a plurality of users during each call state of a plurality of call states;
generating a representation that correlates and presents the amount of time spent using each of the at least one of the plurality of applications by at least one of the plurality of users during each of the at least one of the plurality of call states.

2. The method of claim 1, wherein the representation is a graphical representation and further comprising displaying the graphical representation.

3. The method of claim 2, wherein the application usage information further includes an indicator about specific functionalities used for each application of the plurality of applications.

4. The method of claim 1, wherein the application usage information includes an occurrence time and duration for each instance that each application of the plurality of applications was used and the call state information includes an occurrence time and duration for each occurrence of each call state of the plurality of call states.

5. The method of claim 1, wherein determining the at least one user of the plurality of users for which the graphical representation should be displayed comprises:
receiving a user indication of the at least one user.

6. The method of claim 1, wherein determining the at least one user of the plurality of users for which the graphical representation should be displayed comprises:
selecting the at least one user of the plurality of users based on the application information and the call state information meeting a criteria.

7. The method of claim 6, wherein the criteria comprises a threshold amount of time that an application of the plurality of applications is used during a call state of the plurality of call states and wherein exceeding the threshold results in the selection of the at least one user.

8. A system for analyzing application usage, comprising:
an interface configured to receive application usage information and call state information;
a processing system configured to process the application usage information and the call state information to determine an amount of time spent using each application of a plurality of applications by each user of a plurality of users during each call state of a plurality of call states and generates a representation that correlates and presents the amount of time spent using each of the at least one of the plurality of applications by at least one of the plurality of users during each of the at least one of the plurality of call states.

9. The system of claim 8, wherein the representation is a graphical representation and further comprising a display configured to display the graphical representation.

10. The system of claim 9, wherein the application usage information further includes an indicator about specific functionalities used for each application of the plurality of applications.

11. The system of claim 8, wherein the application usage information includes an occurrence time and duration for each instance that each application of the plurality of applications was used and the call state information includes an occurrence time and duration for each occurrence of each call state of the plurality of call states.

12. The system of claim 8, further comprising:
the processing system configured to receive a user indication of the at least one user to determine the at least one user of the plurality of users for which the graphical representation should be displayed comprises.

13. The system of claim 8, further comprising:
the processing system configured to select the at least one user of the plurality of users based on the application information and the call state information meeting a criteria to determine the at least one user of the plurality of users for which the graphical representation should be displayed.

14. The system of claim 13, wherein the criteria comprises a threshold amount of time that an application of the plurality of applications is used during a call state of the plurality of call states and wherein exceeding the threshold results in the selection of the at least one user.

15. A non-transitory computer readable medium having instructions stored thereon for operating a system for analyzing application usage, wherein the instructions, when executed by the system, instruct the system to:
receive application usage information and call state information, wherein the application usage information includes application timing information for each instance that each application of the plurality of applications was used and the call state information includes call state timing information for each occurrence of each call state of the plurality of call states;
process the application usage information and the call state information to determine an amount of time spent using each application of a plurality of applications by each user of a plurality of users during each call state of a plurality of call states; and
generate a representation that correlates and presents the amount of time spent using each of the at least one of the plurality of applications by at least one of the plurality of users during each of the at least one of the plurality of call states.

16. The computer readable medium of claim 15, wherein the representation is a graphical representation and the instructions further direct the system to display the graphical representation.

17. The computer readable medium of claim 16, wherein the application usage information further includes an indicator about specific functionalities used for each application of the plurality of applications.

18. The computer readable medium of claim 15, wherein the application timing information includes an occurrence time and duration for each instance that each application of the plurality of applications was used and the call state timing information includes an occurrence time and duration for each occurrence of each call state of the plurality of call states.

19. The computer readable medium of claim 15, wherein the instructions further direct the system to receive a user indication of the at least one user to determine the at least one user of the plurality of users for which the graphical representation should be displayed.

20. The computer readable medium of claim 15, wherein the instructions further direct the system to select the at least one user of the plurality of users based on the application information and the call state information meeting a criteria to determine the at least one user of the plurality of users for which the graphical representation should be displayed.

* * * * *